United States Patent
Ohno

(10) Patent No.: US 8,250,291 B2
(45) Date of Patent: Aug. 21, 2012

(54) IMAGE PROCESSING APPARATUS, ACCESS CONTROL METHOD, RECORDING MEDIUM

(75) Inventor: Satoru Ohno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 380 days.

(21) Appl. No.: 12/627,437

(22) Filed: Nov. 30, 2009

(65) Prior Publication Data

US 2010/0169539 A1  Jul. 1, 2010

(30) Foreign Application Priority Data

Dec. 25, 2008  (JP) ................. 2008-331050

(51) Int. Cl.
*G06F 12/00* (2006.01)

(52) U.S. Cl. ......... 711/103; 711/163; 711/165; 711/170

(58) Field of Classification Search ........................ None
See application file for complete search history.

(56) References Cited

U.S. PATENT DOCUMENTS 6,148,377 A * 11/2000 Carter et al. ................. 711/147

| | | |
|---|---|---|
| 2008/0052484 A1 | 2/2008 | Ohno |
| 2008/0062450 A1 | 3/2008 | Sugishita et al. |
| 2008/0106769 A1 | 5/2008 | Ohno |
| 2008/0309957 A1 | 12/2008 | Horiuchi et al. |

FOREIGN PATENT DOCUMENTS

| JP | 9-200413 | 7/1997 |
|---|---|---|
| JP | 2004-334679 | 11/2004 |
| JP | 2005-354671 | 12/2005 |
| JP | 2008-244518 | 10/2008 |
| JP | 4200067 | 10/2008 |

* cited by examiner

*Primary Examiner* — Shawn X Gu

(74) *Attorney, Agent, or Firm* — Oblon, Spivak, McClelland, Maier & Neustadt, L.L.P.

(57) ABSTRACT

An image processing apparatus includes a nonvolatile memory device including a first storage area configured to store one or more predetermined information items; a secondary storage device including a second storage area configured to store the predetermined information items; and an access control unit configured to control access to the first storage area and the second storage area in response to an access request to access the predetermined information items.

14 Claims, 13 Drawing Sheets

FIG.4

| IDENTIFIER | USER NAME | STORAGE LOCATION | PROTECTION SETTING | COUNTER | IMPORTANCE LEVEL |
|---|---|---|---|---|---|
| 1 | AAAA | BASIC | ACTIVE | 3 | HIGH |
| 2 | BBBB | EXPANDED | INACTIVE | 10 | LOW |
| 3 | CCCC | BASIC | ACTIVE | 5 | HIGH |
| ..... | ..... | ..... | ..... | ..... | ..... |

| STORAGE LOCATION | ITEM |
|---|---|
| BASIC AREA | USER NAME, E-MAIL ADDRESS, IDENTIFIER, USER ID, PROTECTION SETTING, IMPORTANCE LEVEL |
| EXPANDED AREA | OPTION INFORMATION USABLE FUNCTION |

FIG.6

| IDENTIFIER | 1 |
|---|---|
| USER NAME | AAAA |
| USER ID | 12345678 |
| USABLE FUNCTION | COPY (FULL-COLOR/MONOCHROME), FAX TRANSMISSION |
| E-MAIL ADDRESS | AAAA@xxx.xx |
| OPTION INFORMATION (PRESENCE/ABSENCE) | PRESENT (HEADSHOT) |
| PROTECTION SETTING | ACTIVE |
| IMPORTANCE LEVEL | HIGH |

Figure 8:
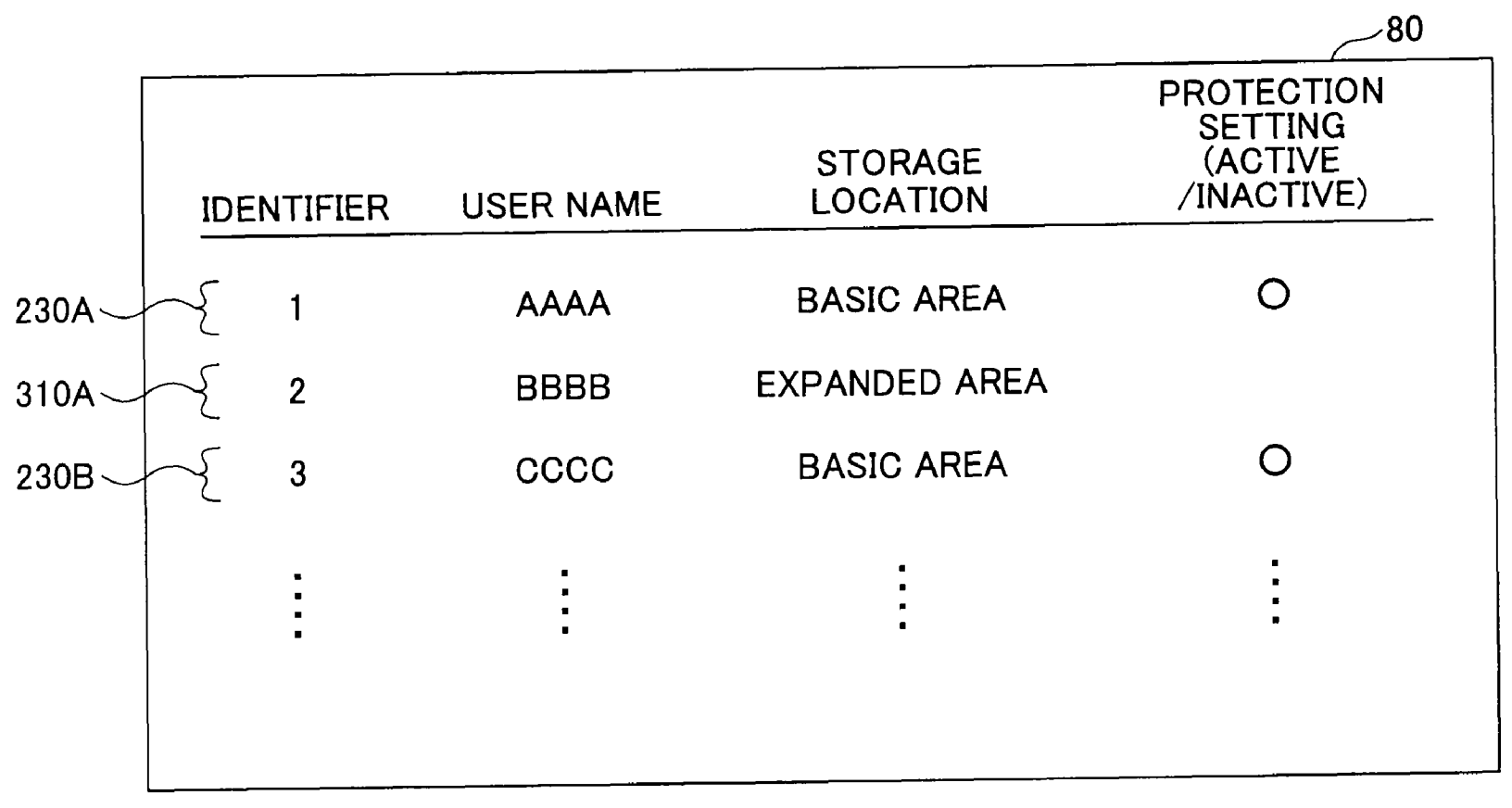

| IDENTIFIER | USER NAME | STORAGE LOCATION | PROTECTION SETTING (ACTIVE /INACTIVE) |
|---|---|---|---|
| 1 | AAAA | BASIC AREA | ○ |
| 2 | BBBB | EXPANDED AREA | ○ |
| 3 | CCCC | BASIC AREA | .... |
| .... | .... | .... | .... |

230A → 1
310A → 2
230B → 3

80

USER NAME: AAAA
USER CODE: 123456789
USABLE FUNCTION: COPY (FULL-COLOR/MONOCHROME), FAX
E-MAIL ADDRESS: xxxxxx@xxxxxx
PROTECTION SETTING: ACTIVE
IMPORTANCE LEVEL: HIGH
OPTION INFORMATION (PRESENCE/ABSENCE): PRESENT (HEADSHOT)

FIG.10

| IDENTIFIER | USER NAME | STORAGE LOCATION | PROTECTION SETTING (ACTIVE/INACTIVE) |
|---|---|---|---|
| 1 | AAAA | BASIC AREA | ○ |
| 2 | BBBB | EXPANDED AREA | ○ |
| 3 | CCCC | BASIC AREA | |
| .... | .... | .... | .... |

83

230A → 1
310A → 2
230B → 3

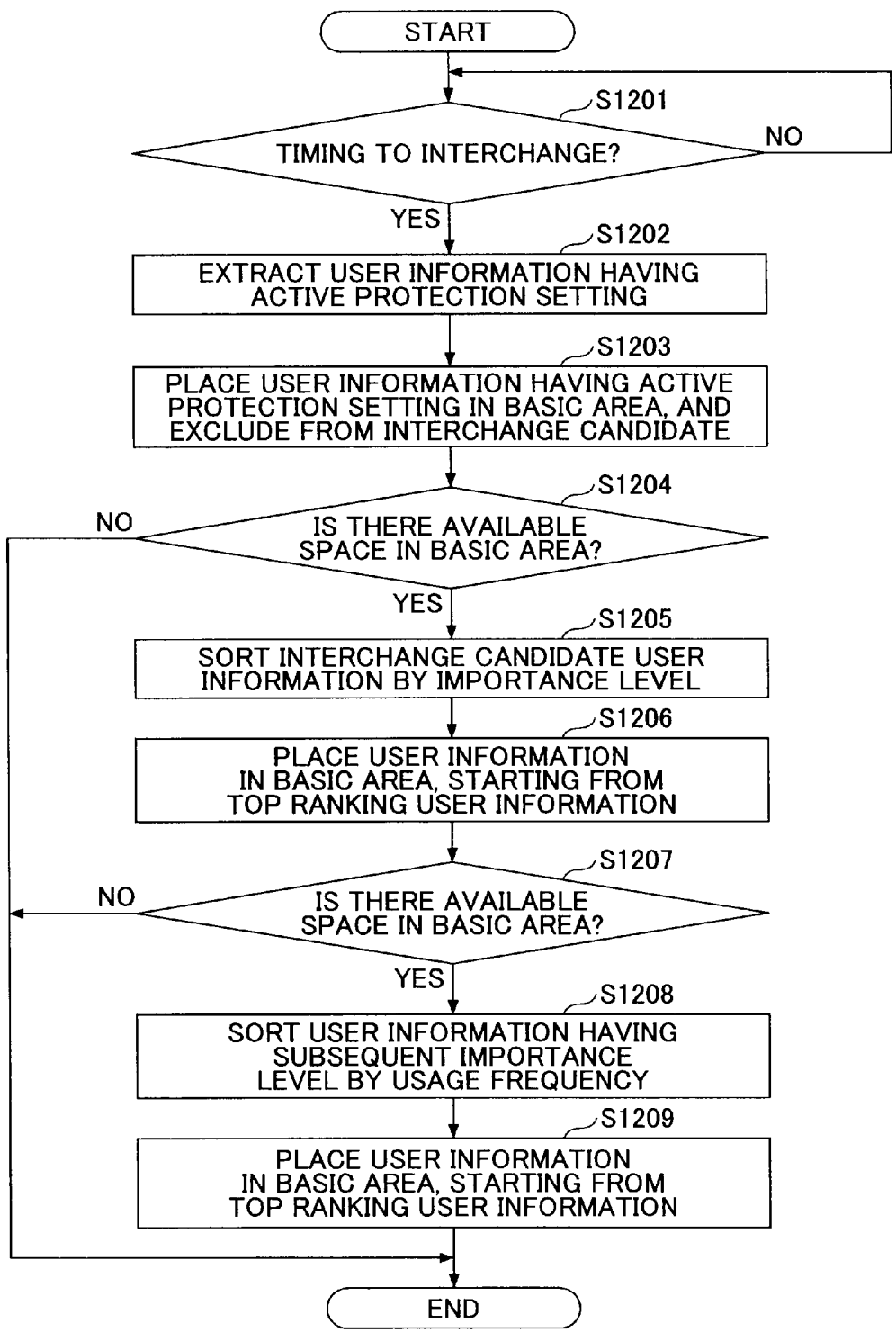

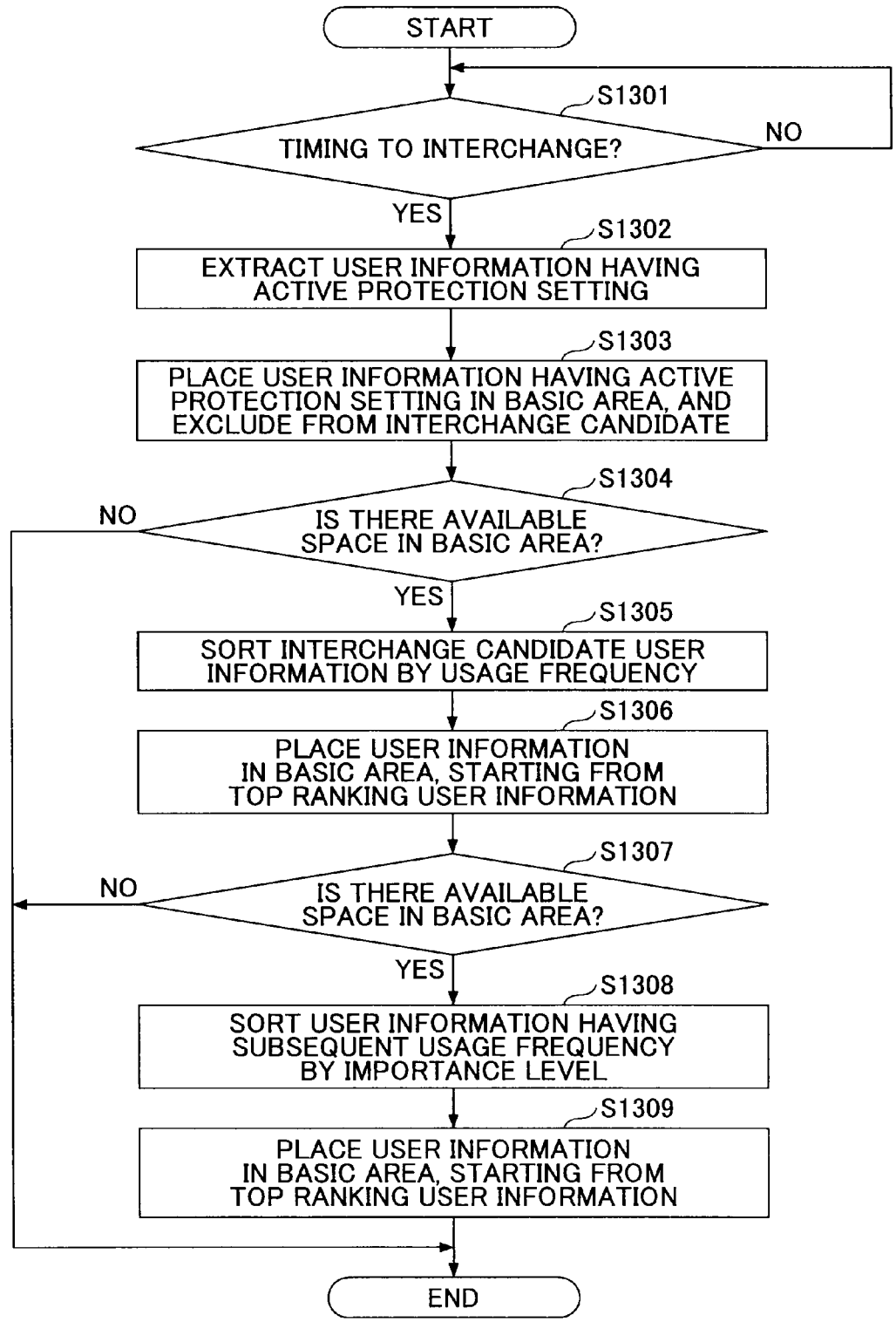

IMAGE PROCESSING APPARATUS, ACCESS CONTROL METHOD, RECORDING MEDIUM

BACKGROUND OF THE INVENTION

1. Field of the Invention

The present invention relates to image processing apparatuses, access control methods, and recording media.

2. Description of the Related Art

In recent years, there have been image processing apparatuses for implementing multiple functions such as a copy function, a fax function, and a scanner function. Such an image processing apparatus includes a nonvolatile memory and a large-capacity memory such as a hard disk. The nonvolatile memory stores initial values that are set at the time of shipment of the image processing apparatus. The large-capacity memory stores user information set for each user and image data obtained by a scanning process performed with the scanner function.

When user information is stored in the large-capacity memory, various processes may be executed with the use of the user information. In one example, image data, which is obtained by a scanning process performed with the scanner function, may be transmitted to an e-mail address included in the user information. In another example, based on information included in the user information indicating which of the functions can be used (usable functions), usage of functions of the image processing apparatus may be restricted according to each user.

Patent document 1 describes an image forming apparatus including a large-capacity memory storing the user information and usage restriction information in association with each other.

Patent Document 1: Japanese Laid-Open Patent Application No. 2008-244518

However, when an image processing apparatus is using user information to execute processes and the hard disk serving as the large-capacity memory crashes, the processes that are executed with the use of user information cannot be executed until a service person finishes repairing or replacing the hard disk. Thus, the image processing apparatus needs to stop operating during this time.

SUMMARY OF THE INVENTION

The present invention provides an image processing apparatus, an access control method, and a recording medium, in which one or more of the above-described disadvantages are eliminated.

A preferred embodiment of the present invention provides an image processing apparatus, an access control method, and a recording medium with which processes that are executed with the use of user information can be executed even when the large-capacity memory crashes.

According to an aspect of the present invention, there is provided an image processing apparatus including a nonvolatile memory device including a first storage area configured to store one or more predetermined information items; a secondary storage device including a second storage area configured to store the predetermined information items; and an access control unit configured to control access to the first storage area and the second storage area in response to an access request to access the predetermined information items.

According to an aspect of the present invention, there is provided an access control method performed by an image processing apparatus including a nonvolatile memory device including a first storage area configured to store one or more predetermined information items and a secondary storage device including a second storage area configured to store the predetermined information items, the access control method including an access control step of controlling access to the first storage area and the second storage area in response to an access request to access the predetermined information items.

According to an aspect of the present invention, there is provided a computer-readable recording medium storing an access control program that is executed in an image processing apparatus including a nonvolatile memory device including a first storage area configured to store one or more predetermined information items and a secondary storage device including a second storage area configured to store the predetermined information items, the access control program causing the image processing apparatus to perform an access control step of controlling access to the first storage area and the second storage area in response to an access request to access the predetermined information items.

According to one embodiment of the present invention, an image processing apparatus, an access control method, and a recording medium are provided, which are capable of executing processes with the use of user information even when the large-capacity memory crashes.

BRIEF DESCRIPTION OF THE DRAWINGS

Other objects, features and advantages of the present invention will become more apparent from the following detailed description when read in conjunction with the accompanying drawings, in which:

FIG. 4 illustrates an example of a list table;

FIG. 5 illustrates an example of an associated items table;

FIG. 6 illustrates an example of user information;

FIG. 8 illustrates an example of a screen page displaying the list table in an HDD-installed state;

FIG. 10 illustrates an example of a screen page displaying the list table in an HDD-less state;

FIG. 12 is a flowchart for describing the process of interchanging user information performed by an information interchange unit according to an embodiment of the present invention; and FIG. 13 is another flowchart for describing the process of interchanging user information performed by an information interchange unit according to an embodiment of the present invention.

DETAILED DESCRIPTION OF THE PREFERRED EMBODIMENTS

A description is given, with reference to the accompanying drawings, of embodiments of the present invention.

An embodiment of the present invention includes a first storage area provided in a nonvolatile memory device, a second storage area provided in a secondary storage device, and an access control unit for controlling the processes of reading and writing predetermined information in the first storage area and the second storage area, so that the user information is not aggregated in the secondary storage device.

Figure 1:
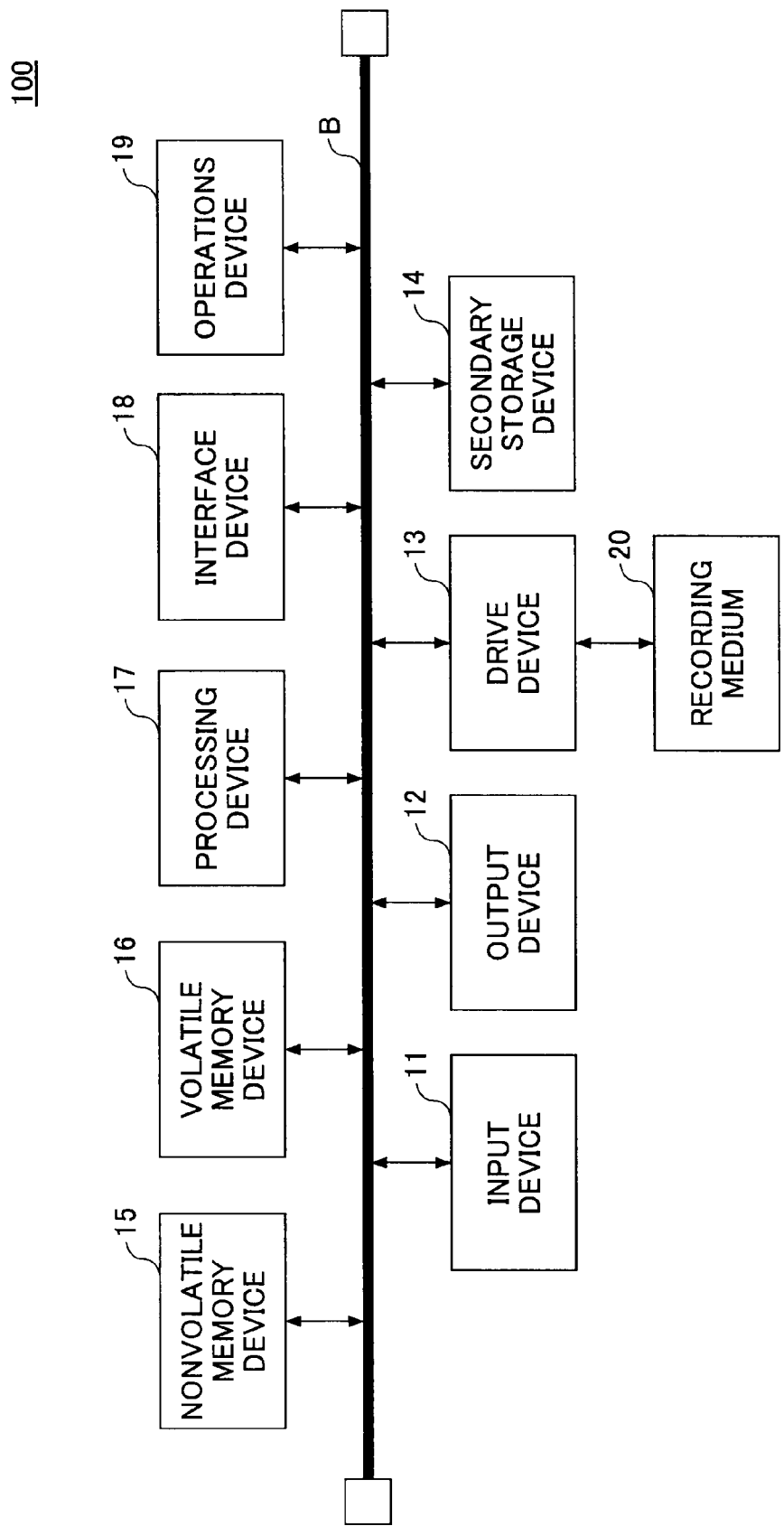
FIG. 1 illustrates a hardware configuration of an image processing apparatus according to an embodiment of the present invention.

FIG. 1 illustrates the hardware configuration of an image processing apparatus 100 according to the present embodiment.

The image processing apparatus 100 includes an input device 11, an output device 12, a drive device 13, a secondary storage device 14, a nonvolatile memory device 15, a volatile memory device 16, a processing device 17, an interface device 18, and an operations device 19, which are interconnected via a bus B.

The input device 11 is for inputting image data, which may be implemented by a scanner. The output device 12 is for outputting image data, which may be implemented by a plotter. The secondary storage device 14 is a large-capacity memory, which may be implemented by a hard disk (hereinafter, "HDD"). The nonvolatile memory device 15 may be implemented by a NVRAM (nonvolatile RAM). The volatile memory device 16 may be implemented by a DRAM (Dynamic Random Access Memory).

The processing device 17 may be a CPU (Central Processing Unit), which implements the functions of the image processing apparatus 100 by executing programs stored in the nonvolatile memory device 15. The interface device 18 may be a modem or a LAN card, which is used for connecting the image processing apparatus 100 to a network. The operations device 19 is used for operating the image processing apparatus 100, which may be implemented by an operations panel having a display function.

The access control program according to an embodiment of the present invention is at least one of the programs for controlling the image processing apparatus 100. For example, the access control program is provided by being distributed in a recording medium 20 or by being downloaded from a network. The recording medium 20 including the access control program may be any kind of recording medium, including a recording medium for optically, electrically, or magnetically recording information such as a CD-ROM, a flexible disk, and a magneto-optical disk; and a semiconductor memory for electrically recording information such as a ROM and a flash memory.

When the recording medium 20 having the recorded access control program is set in the drive device 13, the access control program is installed in the secondary storage device 14 from the recording medium 20 via the drive device 13. An access control program downloaded from the network is installed in the secondary storage device 14 via the interface device 18.

The secondary storage device 14 stores the installed access control program together with the required files and data. When the computer is started up, the volatile memory device 16 reads the access control program from the secondary storage device 14, and stores the access control program. The processing device 17 implements various processes described below in accordance with the access control program stored in the volatile memory device 16.

In the present embodiment, both the secondary storage device 14 and the nonvolatile memory device 15 include a storage area.

Figure 2:
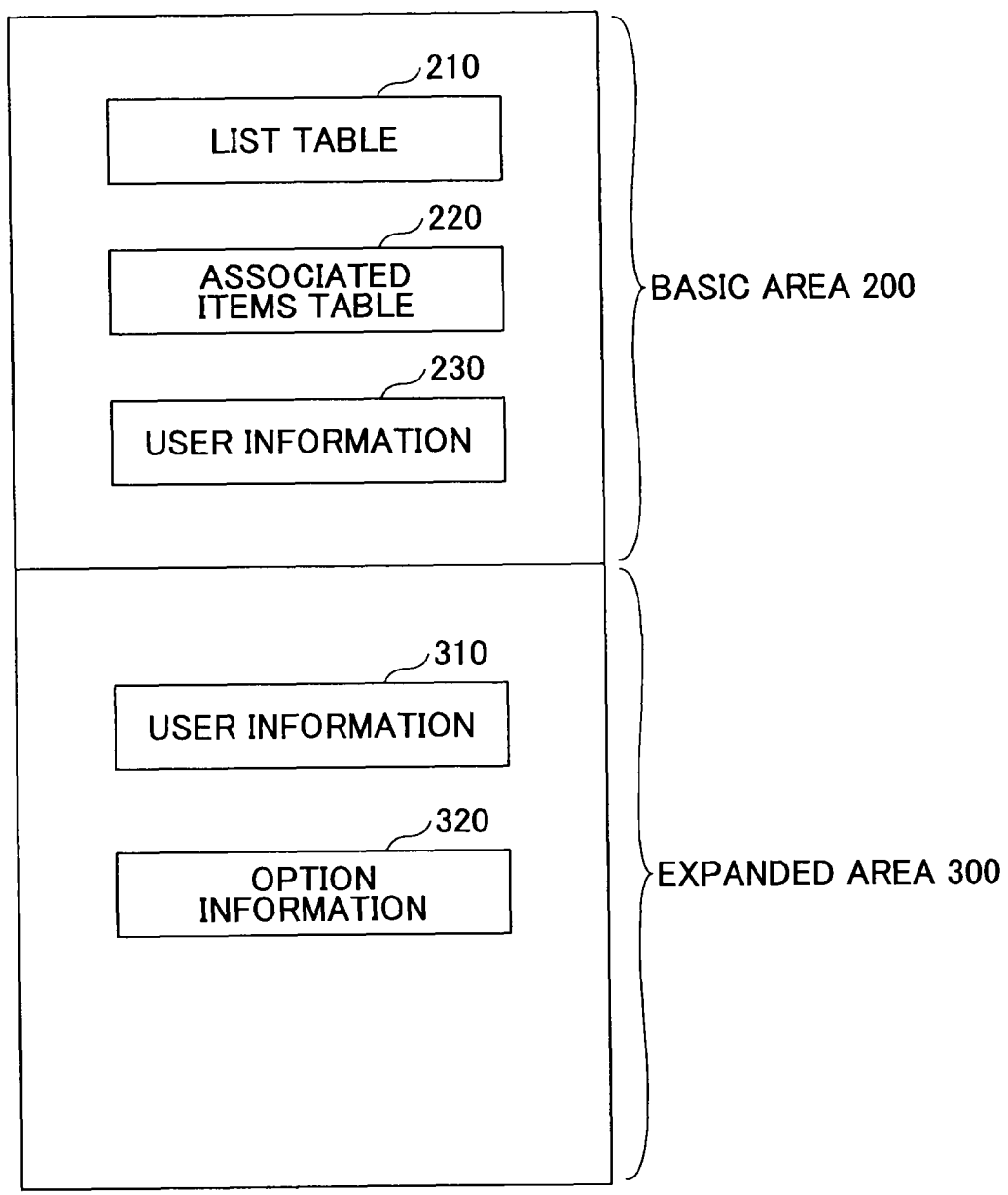
FIG. 2 illustrates storage areas provided in a secondary storage device and a nonvolatile memory device.

With reference to FIG. 2, a description is given of the storage area provided in the secondary storage device 14 and the nonvolatile memory device 15. FIG. 2 illustrates storage areas provided in the secondary storage device 14 and the nonvolatile memory device 15.

In the present embodiment, a basic area 200 is the storage area provided in the nonvolatile memory device 15, and an expanded area 300 is the storage area provided in the secondary storage device 14.

The basic area 200 stores a list table 210, an associated items table 220, and user information 230. The expanded area 300 includes user information 310 and option information 320.

In the present embodiment, the memory capacity of the basic area 200 is smaller than that of the expanded area 300, and the data size of the user information 230 that can be stored in the basic area 200 is set in advance. In the present embodiment, when user information is input in the image processing apparatus 100, but there is no available space in the basic area 200, the input user information is stored as the user information 310 in the expanded area 300. When there is available space in both the basic area 200 and the expanded area 300, and the user has specified the area to be prioritized, the specified area is prioritized as the storage area for the input user information.

The list table 210 indicates the storage area in which the user information 230 and the user information 310 is stored (hereinafter, "storage location"). In the associated items table 220, the information items included in the user information 230 and the storage locations of such information items are associated with each other.

For example, the user information 230 includes a user name, a user ID, an e-mail address, an importance level, and a usage frequency. The user information 310 stored in the expanded area 300 includes the same items as those of the user information 230 stored in the basic area 200. The user information 230 and the user information 310 is selected according to user specification, and has high usability.

The user information 230 and the user information 310 is placed in the nonvolatile memory device 15 in an HDD-less state described below. The user information 230 and the user information 310 is placed in the secondary storage device 14 in an HDD-installed state described below.

The option information 320 has a larger data size than that of the user information 230 or the user information 310. The option information 320 is an application for displaying an operations screen page customized for each image data item and each user, which is stored in association with the user information 230 and the user information 310.

Details on the information stored in the basic area 200 and the expanded area 300 are described below.

Figure 3:
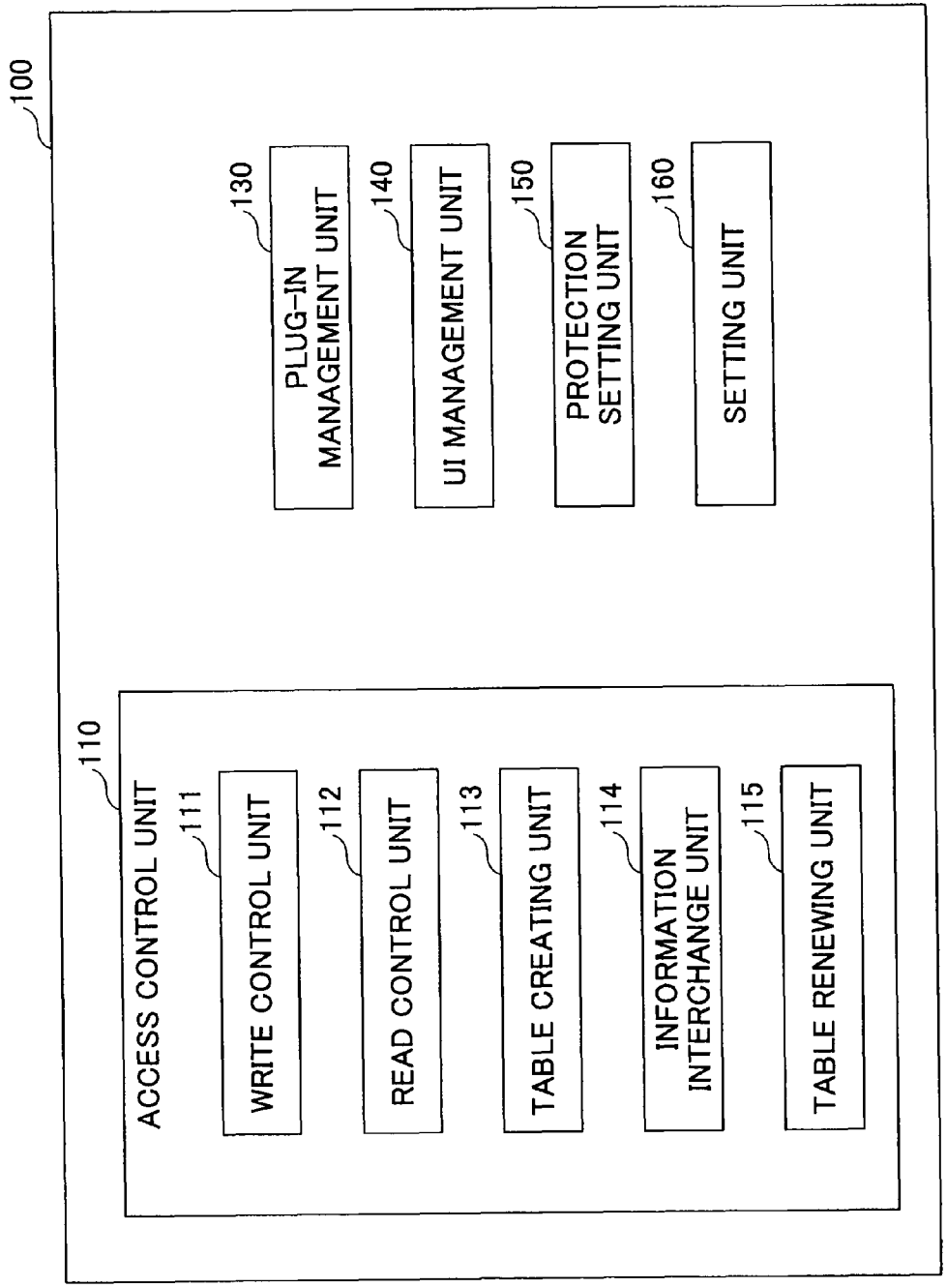
FIG. 3 illustrates a functional configuration of the image processing apparatus according to an embodiment of the present invention.

Next, a description is given of the functional configuration of the image processing apparatus 100 according to the present embodiment with reference to FIG. 3. FIG. 3 illustrates the functional configuration of an image processing apparatus 100 according to the present embodiment.

The image processing apparatus 100 includes an access control unit 110, a plug-in management unit 130, a UI (User Interface) management unit 140, a protection setting unit 150, and a setting unit 160.

The access control unit 110 controls the operations of reading and writing the user information in the basic area 200 and the expanded area 300. The access control unit 110 includes a write control unit 111, a read control unit 112, a table creating unit 113, an information interchange unit 114, and a table renewing unit 115. In the access control unit 110, the write control unit 111 controls the operations of storing the user information 230 and the user information 310 in the basic area 200 and the expanded area 300. In the access control unit 110, the read control unit 112 controls the operations of reading the user information 230 and the user information 310 from the basic area 200 and the expanded area 300.

The table creating unit 113 creates the list table 210. The table creating unit 113 creates the list table 210 with reference to the basic area 200 and the expanded area 300.

The information interchange unit 114 interchanges (changes the storage locations of) the user information 230 stored in the basic area 200 and the user information 310 stored in the expanded area 300. The information interchange unit 114 interchanges the user information 230 and the user information 310 at a timing set in advance, based on conditions set in advance. The conditions and the timing for the interchanging may be set by the setting unit 160.

For example, the conditions for interchanging the information may be based on the importance levels included in the user information 230 and the user information 310. For example, the information interchange unit 114 may interchange the information such that user information items having a high importance level, which are included among the user information 230 and the user information 310, are stored in the basic area 200. The conditions for interchanging the information may be based on the usage frequency of the image processing apparatus 100. The information indicating the usage frequency may be included in the user information 230 and the user information 310, or may be included in the list table 210. For example, the information interchange unit 114 may interchange the information such that user information items having a high usage frequency, which are included among the user information 230 and the user information 310, are stored in the basic area 200.

The table renewing unit 115 renews the list table 210 after the information interchange unit 114 has interchanged the user information 230 and the user information 310.

The plug-in management unit 130 determines whether the image processing apparatus 100 is in a state where both the secondary storage device 14 and the nonvolatile memory device 15 are operating (hereinafter, "HDD-installed state"), or in a state where only the nonvolatile memory device 15 is operating (hereinafter, "HDD-less state"). The HDD-less state is a state where the secondary storage device 14 (hereinafter, also referred to as "HDD") has crashed and the information stored in the expanded area 300 cannot be accessed, or a state where the secondary storage device 14 is not installed.

The UI management unit 140 manages the UI such as an operations screen page displayed on the operations device 19, based on determinations made by the plug-in management unit 130. In the HDD-installed state, the UI management unit 140 causes the operations device 19 to display an operations screen page including processes to be implemented with the use of the user information 310 stored in the expanded area 300. In the HDD-less state, the UI management unit 140 causes the operations device 19 to display an operations screen page only including processes to be implemented with the use of the user information 230 stored in the basic area 200.

The protection setting unit 150 sets protection settings for protecting user information in the user information 230 and the user information 310. The protection setting unit 150 according to the present embodiment may set protection settings for protecting the user information 230 and the user information 310 based on information included in the user information 230 and the user information 310, indicating whether a protection setting is to be made active or inactive. The user information having an active protection setting that is set by the protection setting unit 150, is constantly stored in the basic area 200 whenever the information interchange unit 114 interchanges the information.

The setting unit 160 makes various settings in the image processing apparatus 100. For example, the setting unit 160 sets the timings and conditions for interchanging the information performed by the information interchange unit 114.

Next, a description is given of the list table 210, the associated items table 220, the user information 230, and the user information 310, with reference to FIGS. 4 through 6. FIG. 4 illustrates an example of the list table 210.

In the list table 210 according to the present embodiment, identifiers for identifying the user information 230 and the user information 310, user names, storage locations of the user information, indications as to whether a protection setting is active or inactive, counter values, and importance levels, are stored in association with each other. The identifier, the user name, the protection setting (active/inactive), and the importance level are included in the user information 230 and the user information 310 described below.

In the example shown in FIG. 4, the information associated with an identifier 1 indicates that the user name is AAAA, the storage location is the basic area 200, the protection setting is set (active), the counter value is 3, and the importance level is high. The information associated with an identifier 2 indicates that the user name is BBBB, the storage location is the expanded area 300, the protection setting is not set (inactive), the counter value is 10, and the importance level is low. Reference is made to the counter values included in the list table 210 when the user information is interchanged based on usage frequency.

In the present embodiment, the read control unit 112 of the access control unit 110 refers to the list table 210 to find out whether the user information to be read (reading target) is stored in the basic area 200 or the expanded area 300. For example, when the user information that is the reading target corresponds to the identifier 1, the read control unit 112 refers to the storage location associated with the identifier 1 in the list table 210. The list table 210 indicates that the storage location of the user information of the identifier 1 is the basic area 200, and therefore the read control unit 112 accesses the basic area 200 to read the user information that is the reading target.

In the present embodiment, the counter value of each user information item is stored in the list table 210; however, the present invention is not so limited. The counter value may be included in the user information 230 and the user information 310.

FIG. 5 illustrates an example of the associated items table 220. The associated items table 220 according to the present embodiment indicates which information items of the user information 230 and the user information 310 are to be stored in the basic area 200 and which are to be stored in the expanded area 300.

In the example shown in FIG. 5, the information items to be stored in the basic area 200 are identifiers, user names, user IDs, e-mail addresses, protection settings (active/inactive), and importance levels included in the user information 230 and the user information 310. The information items to be stored in the expanded area 300 are information indicating the usable functions and option information included in the user information 230 and the user information 310.

In the present embodiment, the write control unit 111 of the access control unit 110 refers to the associated items table 220 to find out the storage location of the information to be written (writing target). The write control unit 111 refers to the associated items table 220, and writes, into the basic area 200, the identifier, the user name, the user ID, the protection setting (active/inactive), and the importance level included in the user information 230 that is the writing target. The write control unit 111 refers to the associated items table 220, and writes, into the expanded area 300, the information indicating the usable functions and the option information 320 included in the user information 230 that is the writing target.

FIG. 6 illustrates an example of the user information 230. In FIG. 6, user information 230A is used for describing the user information 230 stored in the basic area 200 and the user information 310 stored in the expanded area 300.

The user information 230A according to the present embodiment is input by the user with the operations device 19. The user information 230A includes information indicating an identifier, a user name, a user ID, the usable function, an e-mail address, presence/absence of option information 320, a protection setting (active/inactive), and the importance level.

The identifier is information given for identifying the user information 230A. The identifier according to the present embodiment may be automatically given to the user information 230A by being tied to the input user information 230A when the user information 230A is input to the image processing apparatus 100.

The usable function is information for identifying the function(s) that can be used by each user. For example, the user corresponding to identifier 1 can use the copy function (full-color copying and monochrome copying) and the fax transmission function, but cannot use functions other than these.

The presence/absence of option information indicates the presence/absence of option information that corresponds to the user information 230A identified by the identifier.

The option information 320 according to the present embodiment is associated with the user information 230A, and is larger than the other information items included in the user information 230A. The option information 320 includes, for example, image data of a photograph of the face of the user (headshot), or an application for displaying a UI specific to each user. In the present embodiment, the option information 320 is stored in the expanded area 300. The option information 320 may be associated with the user information 230A by being given the same identifier as that of the user information 230A when stored in the expanded area 300.

The protection setting (active/inactive) is for setting whether the user information 230A identified by the identifier is to be protected. The user information 230A having an active protection setting will be stored in the basic area 200 when the information is interchanged. In the example shown in FIG. 6, the protection setting indicates that the protection setting of the user information 230A identified by the identifier 1 is active. Therefore, the user information 230A identified by the identifier 1 will be stored in the basic area 200 when the information interchange unit 114 interchanges the information. In the present embodiment, the user information 230A that is set to be protected is stored in the basic area 200, and therefore the user information 230A can be protected even when the secondary storage device (HDD) 14 including the expanded area 300 crashes.

The importance level indicates the level of importance of the user information 230A identified by the identifier. The importance level may be set in advance with the operations device 19. The importance level may be determined according to user authorization or the type of information handled by the user. For example, for the user information 230A of a user who frequently handles confidential information, the importance level may be set as "high" indicating that the importance level is high.

A counter value is not included in the user information 230A; however, the counter value may be included in the user information 230 and the user information 310.

Figure 7:
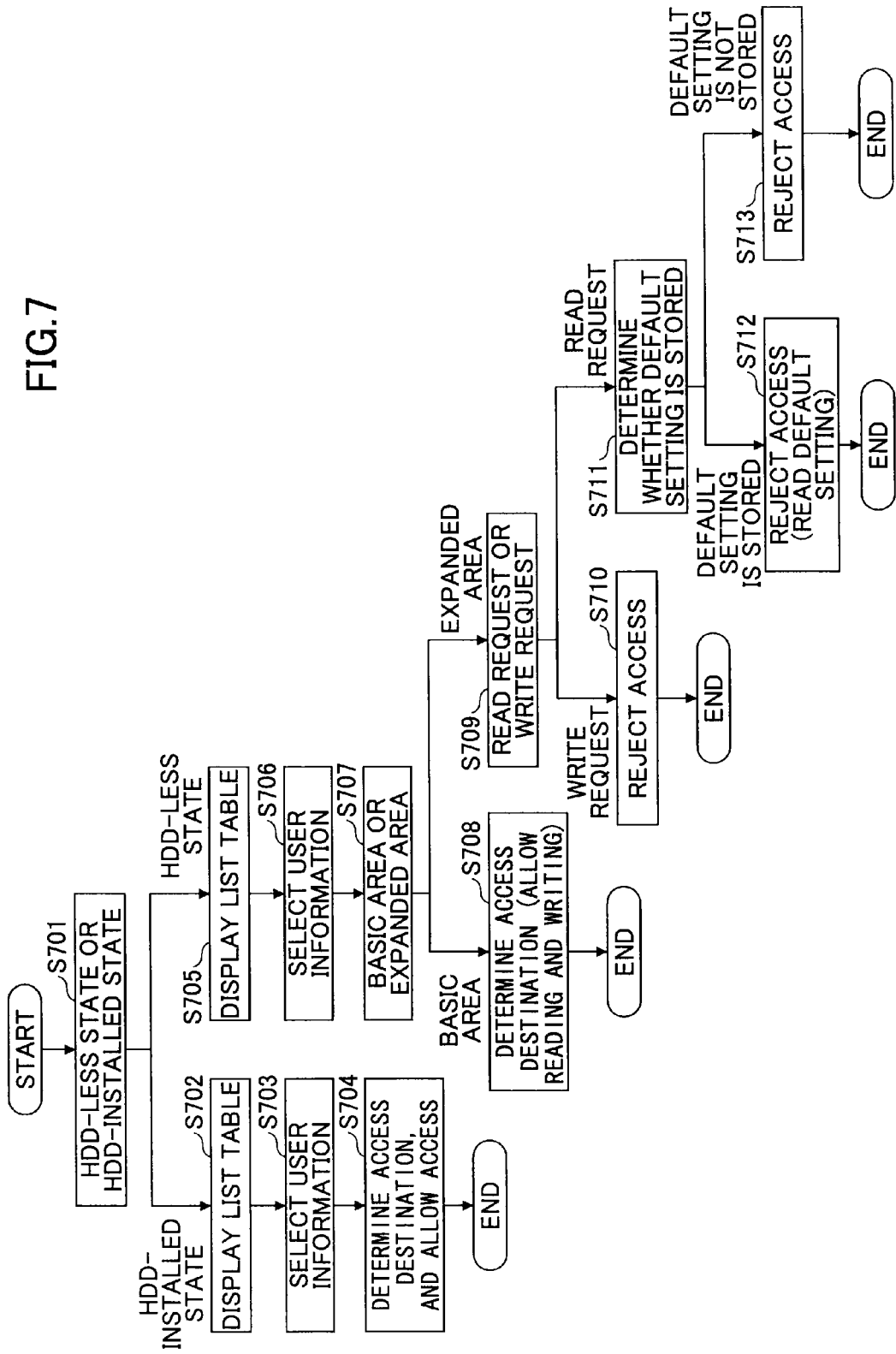
FIG. 7 is a flowchart for describing operations of the image processing apparatus according to an embodiment of the present invention.

Next, a description is given of operations of the image processing apparatus 100 according to the present embodiment with reference to FIG. 7. FIG. 7 is a flowchart for describing operations of the image processing apparatus 100 according to the present embodiment.

In the image processing apparatus 100 according to the present embodiment, when an access request for accessing the user information 230 and the user information 310 is received, the plug-in management unit 130 determines whether the image processing apparatus 100 is in an HDD-less state or an HDD-installed state (step S701). The access request received by the image processing apparatus 100 includes a writing request or a reading request for user information.

In step S701, when the image processing apparatus 100 is in an HDD-installed state, the UI management unit 140 causes the operations device 19 to display the list table 210 stored in the basic area 200 (step S702).

FIG. 8 illustrates an example of a screen page displaying the list table 210 in the HDD-installed state. A screen page 80 shown in FIG. 8 is displaying identifiers, user names, storage locations, and protection settings (active/inactive) of the user information. In the example shown in FIG. 8, the image processing apparatus 100 is in an HDD-installed state, and therefore user information 230A and user information 230B stored in the basic area 200, and user information 310A stored in the expanded area 300 is displayed so that any one of these user information items can be selected.

In the present embodiment, the name of the storage area is displayed as the storage location; however, the type of device may be displayed as the storage location. Furthermore, in the present embodiment, the protection settings (active/inactive) for the user information 230 and the user information 310 may be changed at the screen page 80.

Referring back to FIG. 7, the user selects the user information that is the target of access (access target) from the displayed list table 210 (step S703). When the user information is selected, the access control unit 110 sets the selected user information as the access target, determines the access destination based on the storage location indicated in the list table 210, and allows access (step S704). In the present embodiment, when an access is made by the access control unit 110, the user information selected by the UI management unit 140 may be displayed on the operations device 19.

For example, when the user information selected at step S703 is the user information 230A, the access control unit 110 accesses the basic area 200 because the basic area 200 is the storage location of the user information 230A. The read control unit 112 of the access control unit 110 reads the user information 230A from the basic area 200, and then the UI management unit 140 displays the user information 230A that has been read.

Figure 9:
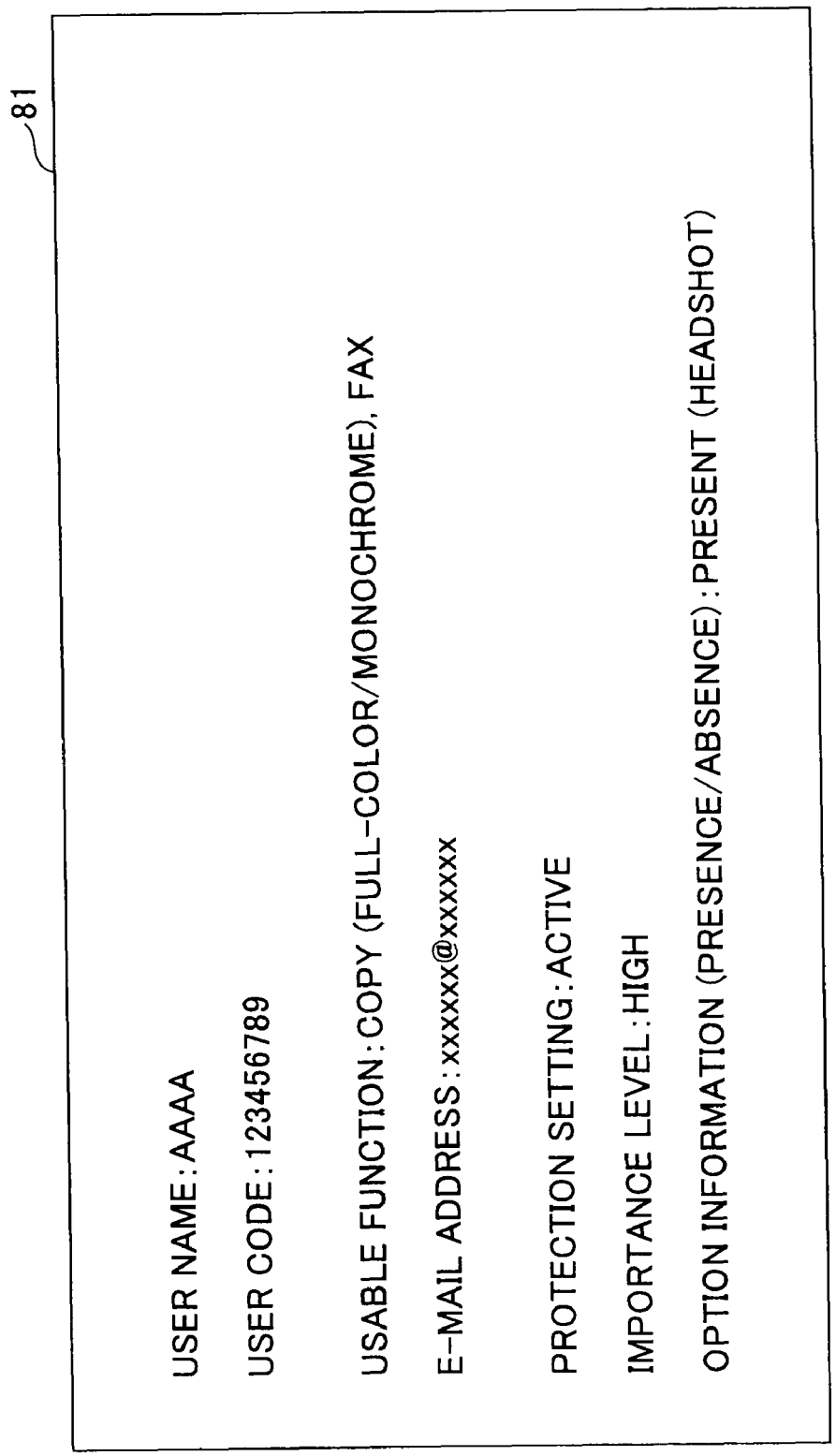
FIG. 9 illustrates an example of a screen page displaying user information selected in an HDD-installed state.

FIG. 9 illustrates an example of a screen page displaying the user information 230A selected in the HDD-installed state.

In the present embodiment, for example, a software keyboard may be displayed when the user touches (presses the touch panel) an information item in the user information 230A at a screen page 81 shown in FIG. 9, so that the user information 230A can be renewed or overwritten. Furthermore, in the present embodiment, settings of the protection setting (active/inactive) or the importance level of the user information 230A may be changed at the screen page 81. Furthermore, in the present embodiment, the user can select the option information to be accessed at the screen page 81. For example, when a headshot is selected as the option information in the screen page 81, the read control unit 112 of the access control unit 110 may access the expanded area 300 and read option information associated to the user information 230A from the expanded area 300.

In the present embodiment, new user information may be input by overwriting the user information 230A displayed on the screen page 81 shown in FIG. 9 with the new user information.

Referring back to FIG. 7, in step S701, when the image processing apparatus 100 is in an HDD-less state, the UI management unit 140 causes the operations device 19 to display the list table 210 of the HDD-less state (step S705).

FIG. 10 illustrates an example of a screen page displaying the list table 210 in the HDD-less state. A screen page 83 shown in FIG. 10 only displays the user information 230A and the user information 230B stored in the basic area 200 as user information that can be selected, because the image processing apparatus 100 is in an HDD-less state. The user information 310A stored in the expanded area 300 may be displayed in grayout (or hatched) to indicate that this information cannot be selected. Furthermore, in the HDD-less state, the protection setting (active/inactive) of the user information 230A and the user information 230B cannot be changed.

Referring back to FIG. 7, the user information that is the access request target is selected from the displayed list table 210 (step S706). When the user information is selected, the access control unit 110 determines the storage location of the selected user information (step S707). When the storage location of the selected user information is the basic area 200, the access control unit 110 determines the access destination (step S708). In step S701, whenever it is determined that the image processing apparatus 100 is in an HDD-less state because the secondary storage device 14 is not installed, the process proceeds to step S708.

For example, when the user information selected at step S706 is the user information 230A, the storage location of the user information 230A is the basic area 200. Thus, the access control unit 110 accesses the basic area 200, the read control unit 112 reads the user information 230A, and the UI management unit 140 displays the user information 230A that has been read.

Figure 11:
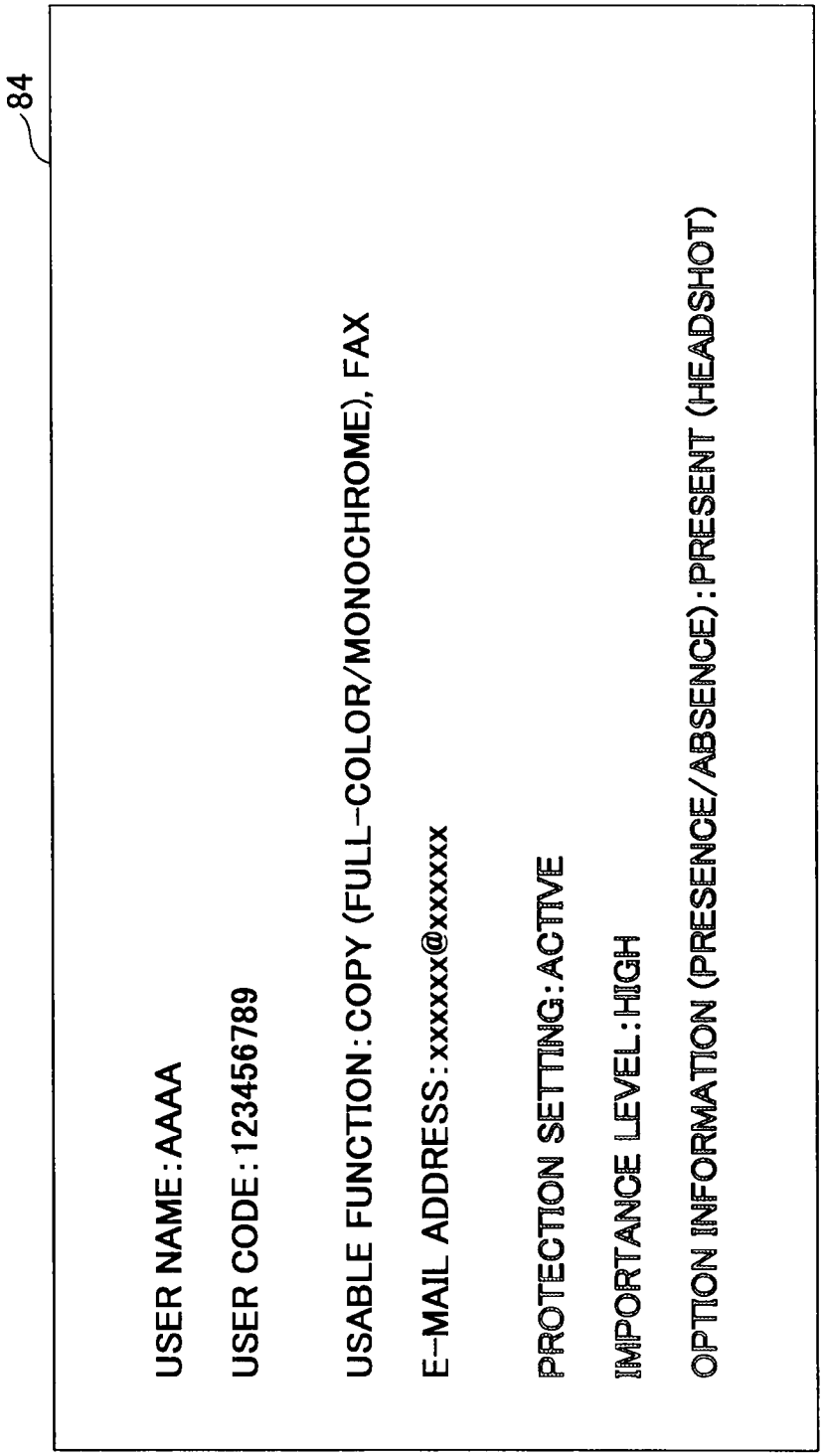
FIG. 11 illustrates an example of a screen page displaying user information selected in an HDD-less state.

FIG. 11 illustrates an example of a screen page displaying the user information 230A selected in the HDD-less state. In a screen page 84 shown in FIG. 11, the protection setting (active/inactive), the importance level, and the option information may be displayed in grayout (or hatched) to indicate that the protection setting (active/inactive) and the importance level cannot be changed and the option information stored in the expanded area 300 cannot be read.

Referring back to FIG. 7, when the storage location of the user information selected in step S707 is the expanded area 300, the access control unit 110 determines whether the access request is a write request or a read request (step S709).

In step S709, when the access request is a write request, the access control unit 110 rejects the writing into the expanded area 300 by the write control unit 111 (step S710).

In step S709, when the access request is a read request, the read control unit 112 determines whether the default setting of the user information 310, which is the reading request target, is stored in the basic area 200 (step S711). In step S711, when it is determined that the default setting is stored in the basic area 200, the read control unit 112 reads the default setting from the basic area 200 (step S712). The UI management unit 140 may display the read-out default setting on the operations device 19. In step S711, when it is determined that the default setting is not stored in the basic area 200, the read control unit 112 rejects the access (step S713). The UI management unit 140 may display a message saying that the access has been rejected on the operations device 19.

The default setting according to the present embodiment is set in advance at the time of shipment of the image processing apparatus 100. An example of the default setting is a setting of usable functions. For example, when monochrome copying is set as a default setting of the copy function, monochrome copying is performed when a copying process is to be executed without the use of user information. Furthermore, in the present embodiment, the default setting is stored in the basic area 200; however, the default setting may be held in the access control unit 110.

As described above, in the image processing apparatus 100 according to the present embodiment, even when the user information 310 in the expanded area 300 cannot be read because the secondary storage device (HDD) 14 has crashed, a regular process can be executed by using the user information 230 stored in the nonvolatile memory device 15. Therefore, the present embodiment increases the possibility of using the required user information to execute a process, even when the secondary storage device (HDD) 14 has crashed.

Next, a description is given of the process of interchanging the user information according to the present embodiment with reference to FIGS. 12 and 13.

In the image processing apparatus 100 according to the present embodiment, the table creating unit 113 creates the list table 210, and then the information interchange unit 114 periodically interchanges the user information 230 stored in the basic area 200 and the user information 310 stored in the expanded area 300 according to conditions. When the interchanging of the user information has been completed, the table renewing unit 115 refers to the user information 230 in the basic area 200 and the user information 310 in the expanded area 300 that has been interchanged, and renews the list table 210.

In the present embodiment, according to the above-described configuration, even when the secondary storage device (HDD) 14 crashes and the image processing apparatus 100 shifts to an HDD-less state from an HDD-installed state, the image processing apparatus 100 can operate similarly to an HDD-installed state.

When the information interchange unit 114 according to the present embodiment interchanges the user information, user information with a higher importance level may be placed in the basic area 200 with priority over user information with a lower importance level. Furthermore, when the information interchange unit 114 according to the present embodiment interchanges the user information, user information of a user with a higher usage frequency may be placed in the basic area 200 with priority over user information of a user with a lower usage frequency.

Furthermore, when the information interchange unit 114 according to the present embodiment interchanges the user information, either the importance level or the usage frequency may be prioritized, and the user information may be interchanged based on a condition combining both the importance level and the usage frequency.

FIG. 12 is a flowchart for describing the process of interchanging the user information performed by the information interchange unit 114 according to the present embodiment. FIG. 12 illustrates a case where the importance level is prioritized over the usage frequency when the user information is interchanged based on a condition combining both the importance level and the usage frequency.

The information interchange unit 114 of the image processing apparatus 100 determines whether it is a timing for interchanging the user information (step S1201).

The timing for interchanging the user information is set in advance by the setting unit 160. For example, the user information may be interchanged at predetermined time intervals set by the user. The interchanging may be performed immediately before the image processing apparatus 100 shifts from a regular operating state to a sleeping state (temporarily stopped for saving power). Furthermore, the user information may be interchanged when the protection setting (active/inactive) of the user information 310 is set by the protection setting unit 150 (when the protection setting is made active). The protection setting may become active when there is available space in the basic area 200, or when the basic area 200 is full but there is user information stored in the basic area 200 with an inactive protection setting.

When it is determined that it is a timing for interchanging the user information at step S1201, the information interchange unit 114 extracts user information having an active protection setting, from the user information 230 stored in the basic area 200 and the user information 310 stored in the expanded area 300 (step S1202). Among the extracted user information items having an active protection setting, the user information items that are not stored in the basic area 200 are placed in the basic area 200 and are excluded from candidates of the interchanging process (interchange candidates) by the information interchange unit 114 (step S1203).

Next, the information interchange unit 114 determines whether there is available space in the basic area 200 if the user information items having an active protection setting have been stored in the basic area 200 (step S1204). In step S1204, when it is determined that there is available space, the information interchange unit 114 sorts the user information items that are interchange candidates in a descending order of the importance level (user information items with high importance levels are highly ranked) (step S1205). All of the user information items having an inactive protection setting are interchange candidates. The information interchange unit 114 places the user information items that have been sorted at step S1205 in the basic area 200 in a descending order of the importance level (starting with user information items with high importance levels) (step S1206). In step S1204, when it is determined that there is no available space in the basic area 200, the information interchange unit 114 ends the process of interchanging the user information.

Next, the information interchange unit 114 determines whether there is available space in the basic area 200 (step S1207). When it is determined that there is no available space in step S1207, the information interchange unit 114 ends the process of interchanging the user information.

When it is determined that there is available space at step S1207, the information interchange unit 114 sorts the user information items having subsequent importance levels in a descending order of the usage frequency (user information items of high frequency are highly ranked) (step S1208). The usage frequency in the present embodiment is determined based on counter values. The counter values are provided for each of the identifiers of the user information, and the counter value is incremented every time the image processing apparatus 100 is used. In the present embodiment, it is assumed that the larger the counter value, the higher the usage frequency.

Next, the information interchange unit 114 places the usage information in the basic area 200 in a descending order of the usage frequency (starting with user information items of high frequency), and ends the process of interchanging the user information (step S1209).

In the present embodiment, for example, it is assumed that there is available space for 20 user information items in step S1204, and that there are five user information items with a high importance level, 20 user information items with a middle importance level, and 100 user information items with a low importance level, as a result of the process at step S1205. In this case, the five user information items with a high importance level are placed in the basic area 200 at step S1206. Then, the 20 user information items with a middle importance level are sorted in a descending order of the usage frequency at step S1208, and are placed in the basic area 200 in a descending order of the usage frequency at step S1209, according to the available space in the basic area 200.

Furthermore, it is assumed that there are five user information items with a high importance level, zero user information items with a middle importance level, and five user information items with a low importance level, as a result of the process at step S1205. In this case, the five user information items with a low importance level may be placed in the basic area 200 after the five user information items with a high importance level are placed in the basic area 200. Furthermore, in the present embodiment, the user information items with a low importance level may be set to be placed in the expanded area 300. In this case, the five user information items with a low importance level are not placed in the basic area 200.

In the present embodiment, when the information interchange unit 114 ends the interchanging process, the table renewing unit 115 renews the list table 210 based on the user information 230 in the basic area 200 and the user information 310 in the expanded area 300 that has undergone the interchanging process.

Next, a description is given of another process performed by the information interchange unit 114 according to the present embodiment, with reference to FIG. 13. FIG. 13 is another flowchart for describing the process of interchanging the user information performed by the information interchange unit 114 according to the present embodiment. FIG. 13 illustrates a case where the usage frequency is prioritized over the importance level when the user information is interchanged based on a condition combining both the importance level and the usage frequency.

The processes of steps S1301 through S1304 are the same as the processes of steps S1201 through S1204 shown in FIG. 12, and are thus not further described.

In step S1304, when it is determined that there is available space in the basic area 200, the information interchange unit 114 sorts the interchange candidate user information in a descending order of the usage frequency (step S1305). The information interchange unit 114 places the user information item having the highest usage frequency in the basic area 200 (step S1306).

Next, the information interchange unit 114 determines whether there is available space in the basic area 200 (step S1307). In step S1307, when it is determined that there is no available space in the basic area 200, the information interchange unit 114 places, in the expanded area 300, the user information items other than the user information placed in the basic area 200, and ends the process of interchanging the user information.

In step S1307, when it is determined that there is available space in the basic area 200, the information interchange unit 114 sorts the user information items having subsequent usage frequencies in a descending order of the importance level (step S1308).

Next, the information interchange unit 114 places the usage information in the basic area 200 in a descending order of the importance level, and ends the process of interchanging the user information (step S1309).

As described above, in the present embodiment, the user information is periodically interchanged based on importance levels and usage frequencies, and therefore the appropriate user information can be constantly stored in the basic area 200. In the present embodiment, even when a large-capacity memory such as the secondary storage device (HDD) 14 crashes, a process can be executed with the use of user information. Furthermore, in the present embodiment, user information having an active protection setting is constantly stored in the basic area 200, and therefore even when the secondary storage device (HDD) 14 crashes, the user information to be protected is not lost.

The present embodiment is applicable to a case where an HDD is added onto an image processing apparatus, which is initially in an HDD-less state (initially without an HDD). An image processing apparatus in an HDD-less state is not provided with an HDD (hereinafter, "HDD-less apparatus"). An HDD-less apparatus can store user information in a nonvolatile memory, but can only store a limited amount of information because a nonvolatile memory has low capacity.

When an HDD is added to the HDD-less apparatus for the purpose of increasing the memory capacity, it is necessary to control access to the initially installed nonvolatile memory and the added HDD.

In a conventional HDD-less apparatus, when an HDD is added, the user information stored in the nonvolatile memory of the HDD-less apparatus is moved to the added HDD, so that the data configuration is the same as an apparatus that is initially provided with an HDD.

The present embodiment is applicable to the process of moving the user information when an HDD has been added onto an HDD-less apparatus. In the HDD-less apparatus, the area where user information is stored before adding an HDD may be the basic area 200. In this case, even after adding the HDD, as long as the size of the user information does not exceed the upper limit of the basic area 200, the user information may be stored in the basic area 200.

When the present embodiment is applied to an HDD-less apparatus, according to the above configuration, the initially installed nonvolatile memory and the added HDD can be used effectively so that downtime is reduced.

The present invention is not limited to the specifically disclosed embodiment, and variations and modifications may be made without departing from the scope of the present invention.

The present application is based on Japanese Priority Patent Application No. 2008-331050, filed on Dec. 25, 2008, the entire contents of which are hereby incorporated herein by reference.

What is claimed is:

1. An image processing apparatus comprising:
a nonvolatile memory device including a first storage area configured to store one part of a plurality of predetermined information items;
a secondary storage device including a second storage area configured to store another part of the plurality of the predetermined information items;
an access control unit configured to control access to the first storage area and the second storage area in response to an access request to access the plurality of predetermined information items; and
a determining unit configured to determine whether both the nonvolatile memory device and the secondary storage device can be used,
wherein the access control unit controls access to the first storage area and the second storage area based on a determination result of the determining unit.

2. The image processing apparatus according to claim 1, wherein
the first storage area stores a table in which identifiers for identifying the plurality of the predetermined information items and storage areas indicating where the plurality of the predetermined information items are stored are associated with each other; and
the access control unit specifies either the first storage area or the second storage area as an access destination, based on the table.

3. The image processing apparatus according to claim 1, wherein when the determining unit determines that both the nonvolatile memory device and the secondary storage device can be used, the access control unit allows access to the first storage area and the second storage area.

4. The image processing apparatus according to claim 1, wherein when the determining unit determines that the secondary storage device cannot be used, and a predetermined information item that is an access target of the access request is stored in the first storage area, the access control unit allows access to the first storage area.

5. The image processing apparatus according to claim 1, wherein
when the determining unit determines that the secondary storage device cannot be used, and a predetermined information item that is an access target of the access request is stored in the second storage area,
the access control unit rejects access to the second storage area when the access request is a request to write the predetermined information item that is the access target in the second storage area, and
the access control unit reads a predetermined setting value stored in the first storage area when the access request is a request to read the predetermined information item that is the access target from the second storage area.

6. The image processing apparatus according to claim 1, further comprising:
an interchanging unit configured to interchange the predetermined information items previously stored in the first storage area and the second storage area.

7. The image processing apparatus according to claim 6, wherein
the interchanging unit interchanges the storage areas of the plurality of the predetermined information items previously stored in the first storage area and the second storage area based on an importance level of the predetermined information items.

8. The image processing apparatus according to claim 7, wherein the interchanging unit places the interchanged plurality of the predetermined information items in the first storage area in a descending order of the importance level.

9. The image processing apparatus according to claim 6, wherein the interchanging unit interchanges the storage areas of the plurality of the predetermined information items previously stored in the first storage area and the second storage area based on a usage frequency of the image processing apparatus of a user corresponding to each of the previously stored plurality of the predetermined information items.

10. The image processing apparatus according to claim 9, wherein the interchanging unit places the interchanged plurality of the predetermined information items in the first storage area in a descending order of usage frequencies.

11. The image processing apparatus according to claim 6, wherein the interchanging unit places the interchanged plurality of the predetermined information items in the first storage area according to a user-specified setting.

12. The image processing apparatus according to claim 11, wherein the user-specified setting is a setting for protecting the interchanged plurality of the predetermined information items.

13. An access control method, comprising:
- storing one part of a plurality of predetermined information items in a first storage area in nonvolatile memory;
- storing another part of the plurality of predetermined information items in a second storage area in secondary storage device;
- controlling access to the first storage area and the second storage area in response to an access request to access the plurality of predetermined information items;
- determining a result whether both the nonvolatile memory and the secondary storage device can be used; and
- controlling access to the first storage area and the second storage area based on the result of the determining.

14. A non-transitory computer-readable recording medium storing an access control program that is executed in an image processing apparatus, the access control program causing the image processing apparatus to perform the steps of:
- storing one part of a plurality of predetermined information items in a first storage area in nonvolatile memory;
- storing another part of the plurality of the predetermined information items in a second storage area in secondary storage device;
- controlling access to the first storage area and the second storage area in response to an access request to access the plurality of the predetermined information items;
- determining a result whether both the nonvolatile memory and the secondary storage device can be used; and
- controlling access to the first storage area and the second storage area based on the result of the determining.

* * * * *